United States Patent [19]

Shivers

[11] 4,078,318
[45] Mar. 14, 1978

[54] MATH TEACHING AID

[76] Inventor: Robert M. Shivers, P.O. Box 426, Patterson, La. 70392

[21] Appl. No.: 683,196

[22] Filed: May 4, 1976

[51] Int. Cl.² ............................................. G09B 19/02
[52] U.S. Cl. ................................................... 35/31 R
[58] Field of Search .................. 35/31 R, 31 B, 31 C, 35/31 D, 31 F, 31 G, 69, 70, 71, 72, 9 R

[56] References Cited

U.S. PATENT DOCUMENTS

| 1,548,601 | 8/1925 | Hoeft | 35/31 R X |
| 1,950,072 | 3/1934 | Townsend | 35/31 R |
| 3,708,892 | 1/1973 | Graf | 35/31 D |

FOREIGN PATENT DOCUMENTS 632,330  11/1949  United Kingdom ................ 35/31 R

*Primary Examiner*—William H. Grieb
*Attorney, Agent, or Firm*—Clarence A. O'Brien; Harvey B. Jacobson

[57] ABSTRACT

A math teaching aid device comprising a base structure having upright guides and supports extending vertically therefrom for holding instructional cards for indicating the type of math problem to be taught and solved, together with a gravity operated pointer structure and appropriate guides therefor. Stackable blocks are aligned and contained within portions of the guide structure for association with the charts and the pivotably mounted pointer. As the device is arranged a student being taught simple arithmetic may by counting the number of blocks stacked on the device and in association with the appropriate indicator cards may verify the correct answers to the math problems being solved. This will effectively help the student in learning the correct math.

5 Claims, 4 Drawing Figures

MATH TEACHING AID

BACKGROUND OF THE INVENTION

1. Field of the Invention

This invention relates generally to devices for teaching and aiding self-learning of sinple arithmetic and math problems.

2. Description of the Prior Art

A common problem with known devices for teaching and aiding in self-instruction of math and simple arithmetic is that the devices are unduly complicated and require far too much instruction in the proper use thereof as a teaching tool.

Another problem is that with the complicated devices known the expense of constructing and building same is far higher than the normal individual is willing to pay to achieve the benefits thereof.

Another known problem is that the devices require far too much explanation and initial instruction before an individual can use same for self-instruction.

Known prior art patents which may be pertinent to this invention are as follows:

U.S. Pat. No. 1,548,601, A. E. Hoeft, Aug. 4, 1925;
U.S. Pat. No. 1,950,072, C. P. Townsend, Mar. 6, 1934;
U.S. Pat. No. 3,708,892, Mary C. Graf, Jan. 9, 1973;

None of these known prior art devices offers the new and unique features of the invention disclosed herein.

SUMMARY OF THE INVENTION

An object of the present invention is to provide a math teaching aid device which is simple in operation and easy to use without a large amount of training required.

Another object of the present invention is to provide a device which may be used in teaching the basic arithmatic problems of addition, substraction, multiplication, and division.

A further object of this invention is to provide a device which will be basically self-teaching and may be relied upon by the student to assist him in solving the basic math problems which he will encounter in ordinary daily life.

A still further object of this invention is to provide a simple device which is relatively maintenance free, easy to operate by a person with little training and little understanding of simple arithmetic, all for the purpose of aiding in teaching such an individual proper arithmetic.

The math teaching aid device of this invention will allow an individual, after very simple explanatory instruction, to teach himself the simple basic arithmetic problems and solutions for addition, substraction, multiplication and division. These are math skills which even the most simple and ordinary of people need for everyday basic living. It is well know that hundreds of thousands of people in the United States today still lack the basic, fundamental math skills which most lower level elementary students acquire. The device of this invention will assist and aid greatly in the teaching of such people the basic math skills either with a teacher or instructor, or as a self-instructional tool.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERED EMBODIMENT

Figure 2:
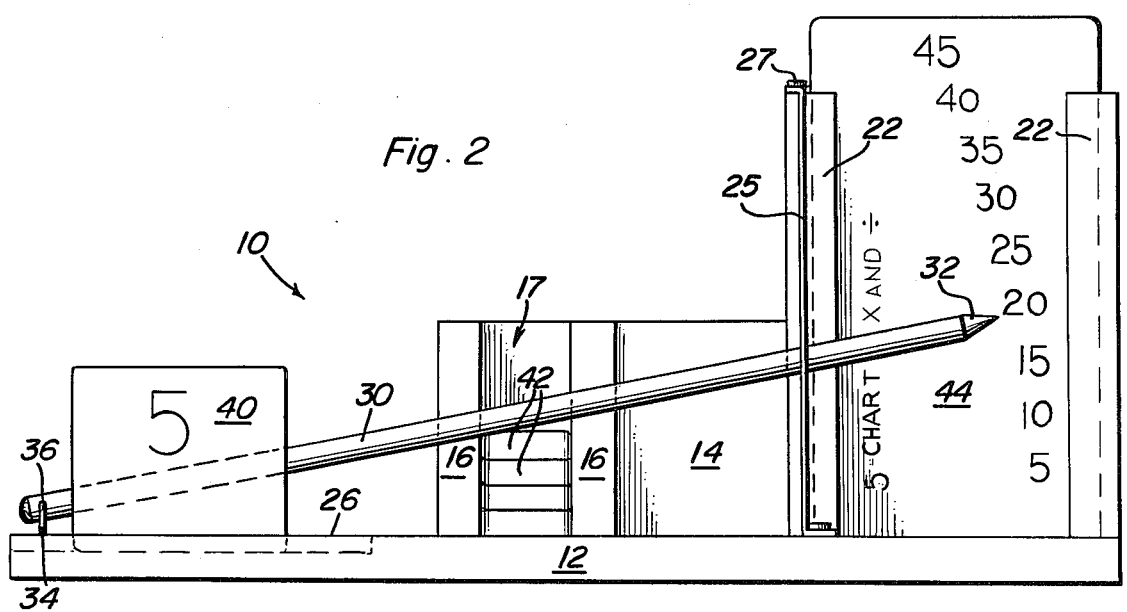
FIG. 2 is a front elevational view of the device of this invention.
Figure 3:
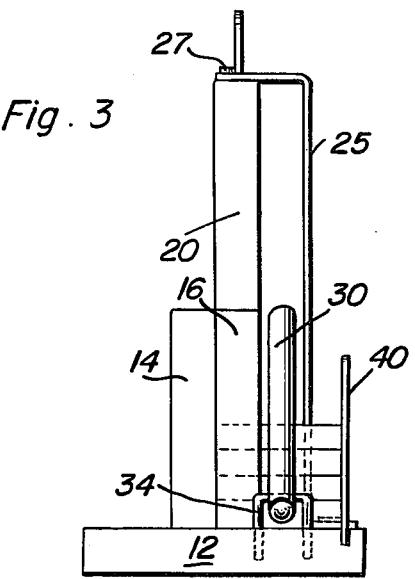
FIG. 3 is an end view as viewed from the left of FIGS. 1 and 2.

Referring to FIG. 2 of the drawings, reference numeral 10 indicates in general the math teaching aid of this invention. As shown, a base member 12 is provided which is basically an elongated rectangular support having upright vertically extending members mounted thereon. These members consist of a back support 14 mounted longitudinally of the base member with guide structures 16 and 20 supported therefrom. The guide structures 16 consist of vertically mounted bars or blocks which form a channel 17 for guiding, aligning and retaining stackable blocks for use with this device.

The vertical support 20 is provided with front mounted flanges 22 to provide a channel 24 along either side of this support. The channels 24 are provided for supporting the indicator cards as used in teaching and solving math problems.

On the end of the base opposite to the chart holder 20 is provided an elongated slot 26 for holding additional cards as used with this math teaching device.

Figure 1:
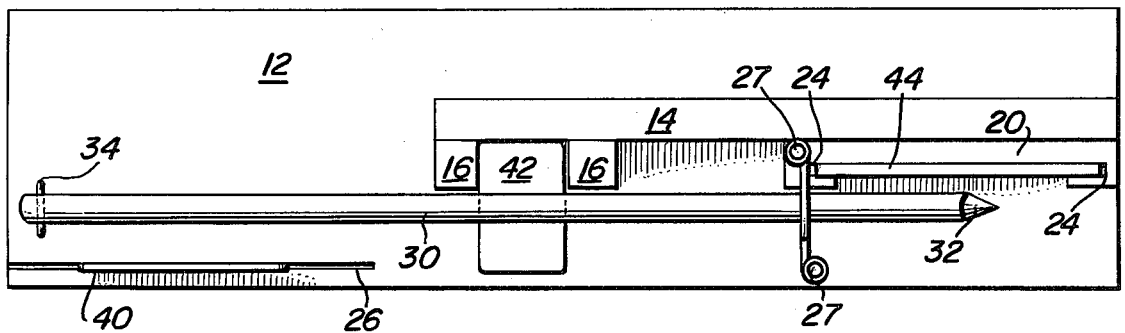
FIG. 1 is a top plan view of the math teaching aid device of this invention.

All of the components described so far are basic rigid elements and relatively maintenance free without anything to malfunction or get out of order. The moving part of this device consists of the pivotally mounted rod 30 which has a pointed tip 32 at one end and is pivotally mounted by means of a support staple 34 passing through a pivot hole 36 at the opposite end of said rod. Since this pivotally mounted rod could be damaged if twisted or moved in a direction towards or away from the back support 14, a pointer guide wire 25 is appropriately mounted by nails or pins 27 to the base 12 and the upper top edge of the chart holder 20 as best seen in FIGS. 1 and 2. This guide will maintain the pointer end of the rod 30 in proper alignment with the chart holder and the charts normally contained therein as will be described below.

Looking at FIG. 4 the component parts for use with the teaching aid device of this invention will now be described. This device is normally for use with teaching individuals basic arithmetic from 1 through 9. The indicator cards 40 are appropriately labeled 1 through 9 with the card number 5 being shown. A number of stackable blocks 42 are also provided of similar shape and size. Basically these are small square or rectangular blocks of thickness of from $\frac{1}{4}$ to $\frac{1}{2}$ inch and with appropriate dimensions in the other parameters. Any desired size may be used for said blocks, preferably a size which is easy to handle by the child or individual using the device. Once the size for the blocks is chosen, then the indicator cards 44 are designed and constructed with the proper type of math operation and the correct solutions indicated thereon.

Figure 4:
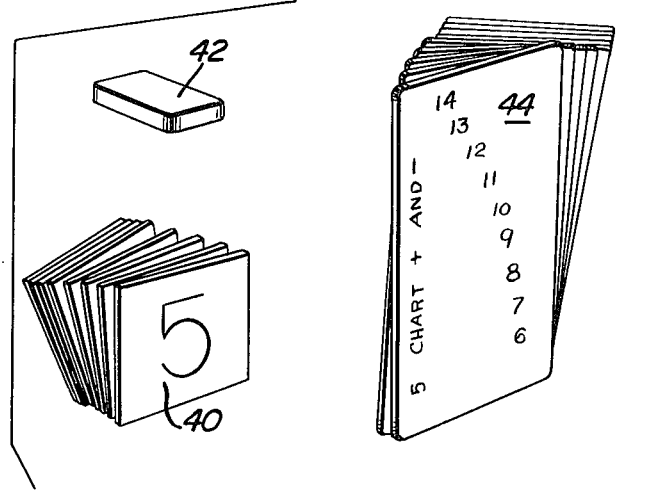
FIG. 4 is a perspective view of the component parts usable with the main support structure of this invention.

As shown in FIG. 4, the top indicator chart 44 is for working with fives and solving math problems of addition and subtraction. The appropriate solutions are indicated along an arcuate path as shown on the chart. The answers in this particular case running from 6 through 14.

Looking at FIG. 2, an indicator card 44 for solving multiplication and division problems for base numeral 5 is shown with the appropriate solutions running from 5 through 45 in an arcuate path inscribed or appropriately indicated thereon.

Any desired method of applying the indicated material may be used, such as printing, inscribing, letter stencil, silk screening, etc. Also, while black ink or paint may be used, it is envisioned different colors may be used for the different numerals and indicator cards. For example, the five tables may be of red color, the three tables of green, the four tables of blue, etc.

The use and operation of this math teaching device will now be described. A teacher or self-instructing student will mount an indicator card with the numeral 5 into the slot 26 at the left of the base. The appropriate corresponding problem and solution chart for the number 5 will also be inserted in the chart holder 20, 22 at the right of the device. Now, for example, assume the student wishes to multiply 5 by 4, four of the stackable blocks 42 will then be placed and stacked within the guides 16 and under the first arm 30 at the center of the device. The pivot arm 30 will obviously be lifted in order to insert the proper number of blocks into the guide channel 17. Upon placing the desired number of stackable blocks in place the pointer is then allowed to rest by gravity action against the topmost block. Then the teacher or student may look at the right side pointer end 32 and read the solution off the indicator chart directly behind the tip of the pointer. In this case 5 × 4 = 20.

In the case of division an opposite procedure is used. For example, in the illustration shown in FIG. 2 with the pointer at 20, if one wishes to determine the answer of 20 divided by 5 he need merely count the number of stacked blocks, i.e. four, to determine the answer. Thus, a student may easily learn multiplication and subtraction with the basic numerals from 1 through 9.

For addition and subtraction a chart card 44 like that shown in FIG. 4 would be appropriately inserted within the chart holder 20 and still using the numeral 5, the number indicator card 44 for 5 would be placed in the slot 26. Again, by counting the number of stacked blocks 42 within the channel 17 and reading the correct answer from the tip of the pointer 32 one can readily see that 5 + 4 = 9 as indicated on the problem and solution indicator card. For subtraction the reverse procedure would obviously be used, that is, 9 − 5 would equal the number of stacked blocks which in this case is 4.

From the above description one can readily visualize how an individual may easily be taught simple arithmetic by the use of this math teaching aid. The device is simple and easy to construct, maintenance free, and yet accurate and efficient.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An educational device comprising: means for teaching addition, subtraction, multiplication, and division including; a main support body structure, changeable means on said main support body structure for indicating the type of math problem and function to be performed, other means associated with the main support body structure for physically stacking a known quantity of object members vertically on each other to represent a known quantity for the math function to be solved, and further means in contact with the stacked object members due to gravity action only and as aligned with the changeable means to indicate the correct answer to the math problem, said changeable means including a card replaceably mounted on the main support body structure, said card having indicia thereon to indicate the math problem and function desired to be performed, the other means including a plurality of similarly shaped object members stackable vertically on the main support body structure, and vertical alignment and positioning means on the main support body structure to keep the said shaped objects in orderly stacked form, said further means including a single lever only mounted for pivotable movement from one end of the main support body structure, said lever extending substantially the length of the main support body structure and with a mid-point thereof freely engageable with the top of the stack of shaped object members, and with the other end of the lever pointed to align with and indicate the correct answer as provided on the replaceable cards as mounted on the main support body structure.

2. The structure as set forth in claim 1, wherein a plurality of replaceable cards are provided for the main support body structure, each card having a different numeral for a different problem and function indicated thereon.

3. The structure as set forth in claim 2, wherein the main support body structure includes upright guide channel structure for holding the indicator cards in a clearly readable position thereon, and a guide member is fastened along one edge of the upright channel structure in order to retain and guide the pivotally mounted lever and in order to prevent damage to the pivot mounting thereof.

4. The structure as set forth in claim 3, wherein the main support body structure includes a slot for holding additional numeral indicating cards, and the additional numeral indicating cards have indicia thereon to indicate primary numerals to be worked with in the math problem.

5. The structure as set forth in claim 4, wherein the alignment and positioning means for the device includes upright members mounted on the top of the main support body structure and extending vertically therefrom, and an upright back structure together with the said upright members form a channel closed at the sides and back in order to align and retain the shaped objects in proper stacked arrangement, with the portions of the shaped object members which extend from the open side of said channel being in operative association with the indicator pivot lever.

* * * * *